(12) United States Patent
Gysling

(10) Patent No.: US 7,963,175 B2
(45) Date of Patent: Jun. 21, 2011

(54) CLAMP-ON APPARATUS FOR MEASURING A FLUID FLOW THAT INCLUDES A PROTECTIVE SENSOR HOUSING

(75) Inventor: Daniel L. Gysling, Glastonbury, CT (US)

(73) Assignee: Expro Meters, Inc., Wallingford, CT (US)

( * ) Notice: Subject to any disclaimer, the term of this patent is extended or adjusted under 35 U.S.C. 154(b) by 52 days.

(21) Appl. No.: 12/422,668

(22) Filed: Apr. 13, 2009

(65) Prior Publication Data

US 2009/0255345 A1    Oct. 15, 2009

Related U.S. Application Data

(60) Provisional application No. 61/044,344, filed on Apr. 11, 2008.

(51) Int. Cl.
*G01F 1/66* (2006.01)
(52) U.S. Cl. .................................... 73/861.27
(58) Field of Classification Search .................. None
See application file for complete search history.

(56) References Cited

U.S. PATENT DOCUMENTS

| | | | |
|---|---|---|---|
| 4,398,424 A | 8/1983 | Abts | |
| 4,467,659 A * | 8/1984 | Baumoel | 73/861.27 |
| 4,735,097 A * | 4/1988 | Lynnworth | 73/861.28 |
| 5,159,838 A * | 11/1992 | Lynnworth | 73/644 |
| 5,515,733 A * | 5/1996 | Lynnworth | 73/861.27 |
| 5,625,140 A | 4/1997 | Cadet et al. | |
| 6,047,602 A * | 4/2000 | Lynnworth | 73/632 |
| 6,397,683 B1 * | 6/2002 | Hagenmeyer et al. | 73/861.18 |
| 6,435,030 B1 | 8/2002 | Gysling et al. | |
| 6,443,226 B1 | 9/2002 | Diener et al. | |
| 6,508,133 B1 * | 1/2003 | Adachi et al. | 73/861.18 |
| 6,532,827 B1 * | 3/2003 | Ohnishi | 73/861.27 |
| 6,558,036 B2 | 5/2003 | Gysling et al. | |
| 6,782,150 B2 | 8/2004 | Davis et al. | |
| 6,895,825 B1 * | 5/2005 | Barkhoudarian | 73/861.28 |
| 7,197,938 B2 | 4/2007 | Gysling et al. | |
| 7,253,742 B2 | 8/2007 | Davis et al. | |
| 7,322,245 B2 | 1/2008 | Gysling et al. | |
| 7,389,187 B2 | 6/2008 | Kersey et al. | |
| 7,430,924 B2 | 10/2008 | Gysling et al. | |
| 7,437,946 B2 | 10/2008 | Gysling | |

(Continued)

FOREIGN PATENT DOCUMENTS

DE    3421176    12/1985

(Continued)

*Primary Examiner* — Harshad Patel
(74) *Attorney, Agent, or Firm* — O'Shea Getz P.C.

(57) ABSTRACT

An apparatus for measuring one or more characteristics of a fluid flowing within a pipe is provided. The apparatus includes a housing, sealant, and an array of at least two ultrasonic sensors. The housing is operable to be mounted on the exterior surface of the pipe. The housing has at least one pocket extending between a pipe-side surface and an outer surface. The pipe-side surface mates with the exterior surface of the pipe. The sealant is disposed between the pipe exterior surface and the housing pipe-side surface. The sealant forms a seal around the pocket when the housing is mounted on the exterior surface of the pipe. The array of ultrasonic sensor units are disposed within the at least one pocket. Each sensor unit includes a transmitter and a receiver. The transmitters are operable to transmit ultrasonic signals through the fluid flow within the pipe. The receivers are operable to receive signals from the transmitters.

12 Claims, 3 Drawing Sheets

U.S. PATENT DOCUMENTS

| | | |
|---|---|---|
| 7,526,966 B2 | 5/2009 | Gysling et al. |
| 7,624,650 B2 * | 12/2009 | Gysling et al. ............. 73/861.27 |
| 7,624,651 B2 * | 12/2009 | Fernald et al. ............. 73/861.27 |
| 7,703,337 B1 * | 4/2010 | Feller ......................... 73/861.27 |
| 2005/0139013 A1 * | 6/2005 | Hashimoto et al. ........ 73/861.27 |
| 2008/0098818 A1 | 5/2008 | Fernald et al. |
| 2009/0025487 A1 | 1/2009 | Gysling et al. |
| 2009/0095088 A1 * | 4/2009 | Berger et al. .............. 73/861.25 |

FOREIGN PATENT DOCUMENTS

| | | |
|---|---|---|
| EP | 1742024 | 1/2007 |
| EP | 1840528 | 10/2007 |

* cited by examiner

CLAMP-ON APPARATUS FOR MEASURING A FLUID FLOW THAT INCLUDES A PROTECTIVE SENSOR HOUSING

This application claims the benefit of U.S. Provisional Patent Application Ser. No. 61/044,344, filed Apr. 11, 2008.

BACKGROUND OF THE INVENTION

1. Technical Field

This invention relates to fluid flow meters utilizing ultrasonic sensors on pipe walls in general, and to the same which use a gel form ultrasonic couplant disposed between the sensor and the pipe wall in particular.

2. Background Information

Clamp-on ultrasonic flow meters are a desirable tool for determining characteristics of a fluid flow traveling through a pipe. Ultrasonic flow meters typically include a plurality of ultrasonic sensors, each having a transmitter and a receiver. In some sensor configurations, ultrasonic signals emitted from the transmitters travel through the immediate pipe wall, the fluid flow disposed within the pipe, and through the opposite pipe wall where they are sensed by the receiver portion. In other sensor configurations, the transmitters and receivers are disposed on the same side of the pipe; the sensed fluid flow signal component is one that has reflected off of the opposite pipe wall and traversed the fluid flow a second time. Regardless of the sensor configuration, the received signal is processed to determine information such as flow velocity, volumetric flow rate, water cut, etc.

It is known to use an acoustic couplant disposed between the pipe wall and one or both of the transmitter and receiver of each sensor. The couplant provides a lower impedance signal path between the pipe and the sensor component and thereby enhances the ability of the sensor to transmit and receive ultrasonic signals.

One of the problems with using a couplant is that it may degrade or migrate away from the interface between the sensor and the pipe surface over time, thereby compromising the performance of the sensor. This is particularly true in applications where the sensors and the couplant are subject to harsh environmental conditions such as large temperature and or humidity variances, exposure to sunlight, and exposure to contaminants (e.g., sand, oil, dirt, etc.). Consequently, there is a need to provide a means for ensuring that a couplant disposed between a sensor and a pipe surface will remain intact and operable without being compromised.

SUMMARY OF THE INVENTION

According to one aspect of the present invention, an apparatus for measuring one or more characteristics of a fluid flowing within a pipe is provided. The apparatus includes a housing, sealant, and an array of at least two ultrasonic sensors. The housing is operable to be mounted on the exterior surface of the pipe. The housing has at least one pocket extending between a pipe-side surface and an outer surface. The pipe-side surface mates with the exterior surface of the pipe. The sealant is disposed between the pipe exterior surface and the housing pipe-side surface. The sealant forms a seal around the pocket when the housing is mounted on the exterior surface of the pipe. The array of ultrasonic sensor units are disposed within the at least one pocket. Each sensor unit includes a transmitter and a receiver. The transmitters are operable to transmit ultrasonic signals through the fluid flow within the pipe. The receivers are operable to receive signals from the transmitters.

According to another aspect of the present invention, a flow meter sensor protective device is provided. The device includes a housing, a sealant, and at least one pocket cover. The housing is operable to be mounted on an exterior surface of a pipe, and includes at least one pocket extending between a pipe-side surface and an outer surface. The pipe-side surface mates with the exterior surface of the pipe. The pocket is sized to receive an array of at least two ultrasonic sensor units. The sealant is operable to be disposed between the exterior surface and pipe-side surface, and is operable to form a seal around the pocket when the housing is mounted on the exterior surface of the pipe. The at least one pocket cover is operable to seal the at least one pocket.

The present apparatus and advantages associated therewith will become more readily apparent in view of the detailed description provided below, including the accompanying drawings.

DETAILED DESCRIPTION OF THE INVENTION

Figure 1:
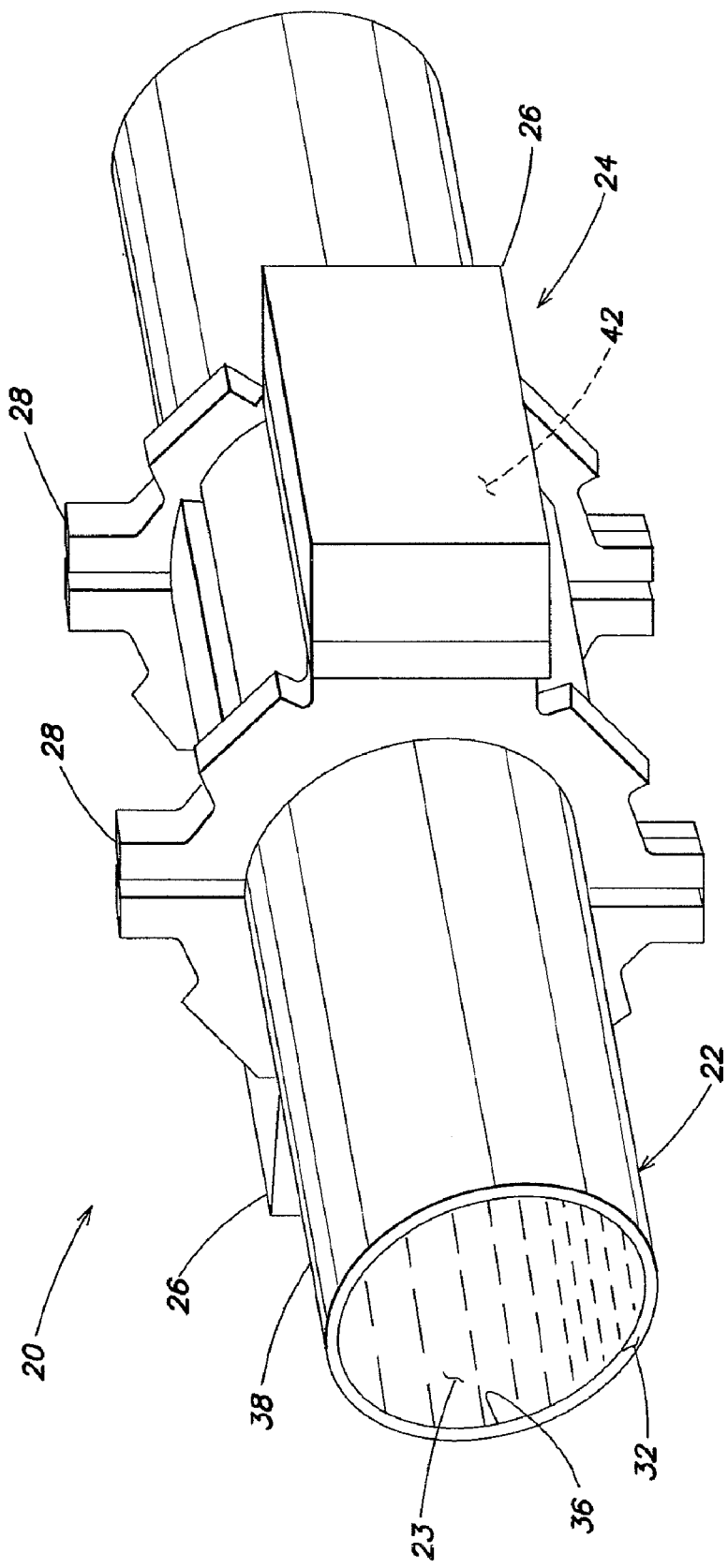
FIG. 1 is a diagrammatic view of an ultrasonic flow meter system mounted on a pipe.

Referring to FIGS. 1-4, an ultrasonic flow meter system 20 is provided operable to be attached to the exterior of a pipe 22 containing a fluid flow 23, which system 20 is sometimes referred to as a "clamp-on" type flow meter system 20. The system 20 includes an ultrasonic flow meter 24, a sensor housing 26, and mounting hardware 28. The pipe 22 has a diameter, a pipe wall 32, an interior surface 36 an exterior surface 38, and an axial centerline.

Figure 5:
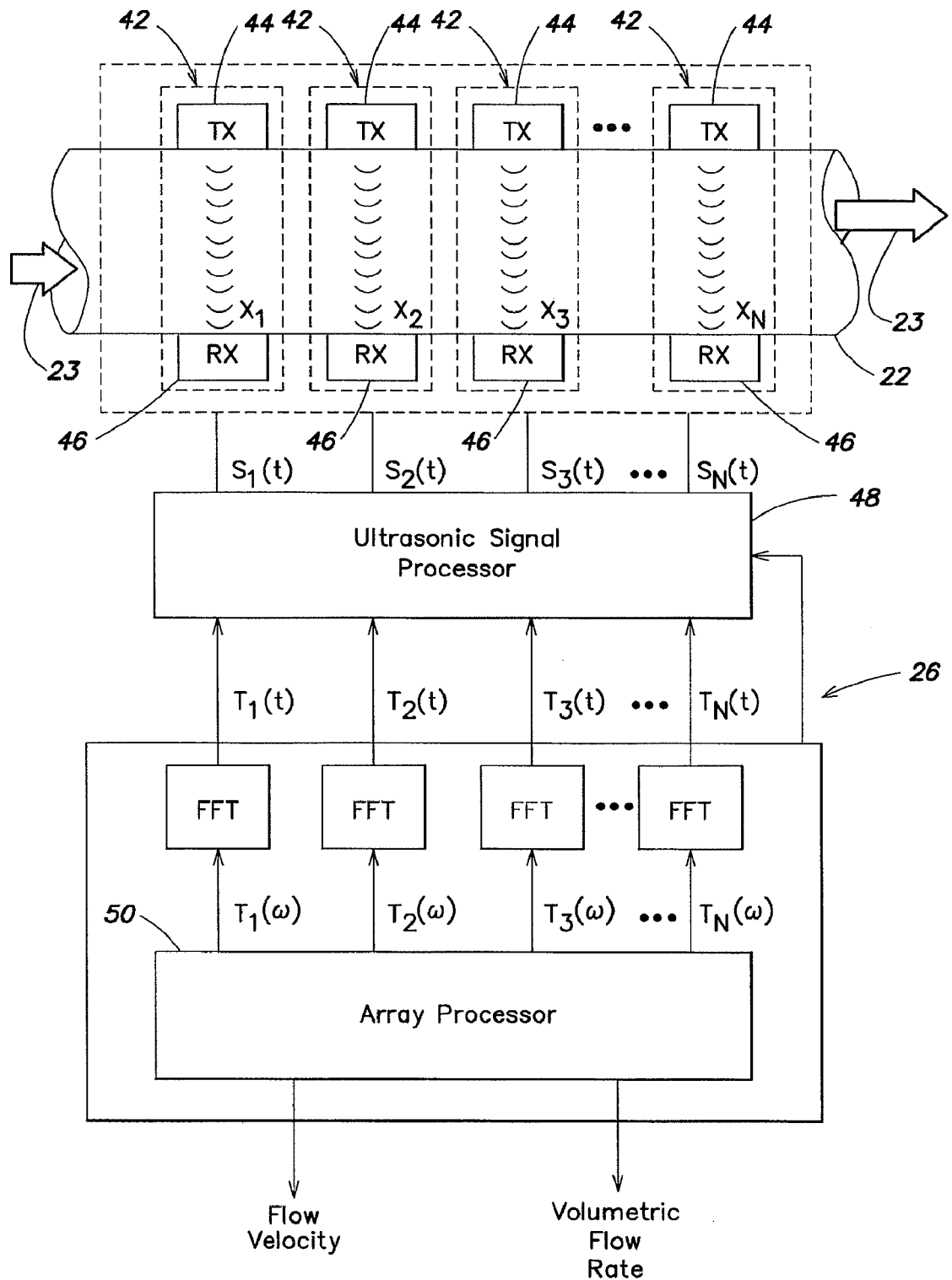
FIG. 5 is a schematic depiction of a fluid flow meter mounted on a pipe.

The ultrasonic flow meter described in U.S. Pat. No. 7,389, 187, which is hereby incorporated by reference in its entirety, is an example of such a device. As can be diagrammatically seen in FIG. 5, the flow meter 24 includes an array of ultrasonic sensors 42 disposed axially along the length of a pipe 22. Each ultrasonic sensor comprises a transmitter 44 (TX) and a receiver 46 (RX) pair. The transmitter 44 provides an ultrasonic signal across the pipe 22 in a direction that is orthogonal to the direction of the fluid flow 23 where it is received by the corresponding receiver 46. The present invention is not limited to use with sensors 42 having orthogonally opposed transmitter-receiver pairs, however, and can be used with alternative sensor 42 configurations such as pitch and catch configurations, pulse echo configurations, and combined transmitter/receiver ultrasonic sensors 42.

The signals $S_1(t)$-$S_N(t)$ received from each ultrasonic sensor 42 are processed by an ultrasonic signal processor 48 and a signal processor 50 (having an array processor) for determining the velocity of the fluid flow 23 and/or volumetric flow rate. The signal processor 50 includes array processing logic, examples of which include SONAR processing logic and cross-correlation processing logic.

Figure 2:
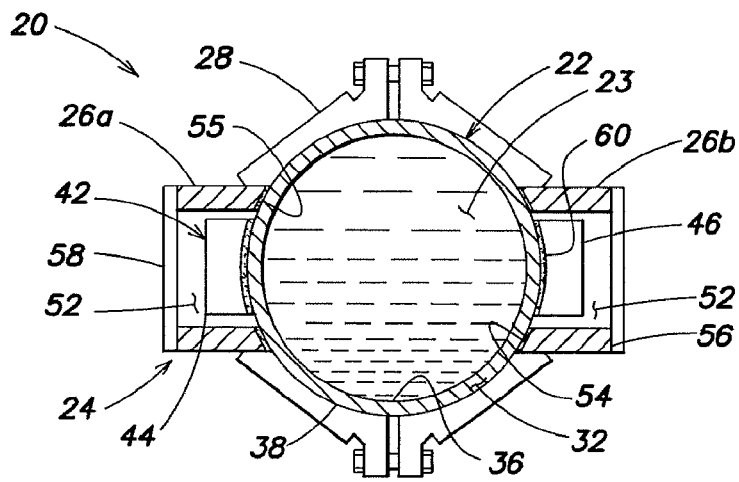
FIG. 2 is a diagrammatic cross-sectional view of the flow meter system illustrating an embodiment of the present invention sensor protective device.
Figure 3:
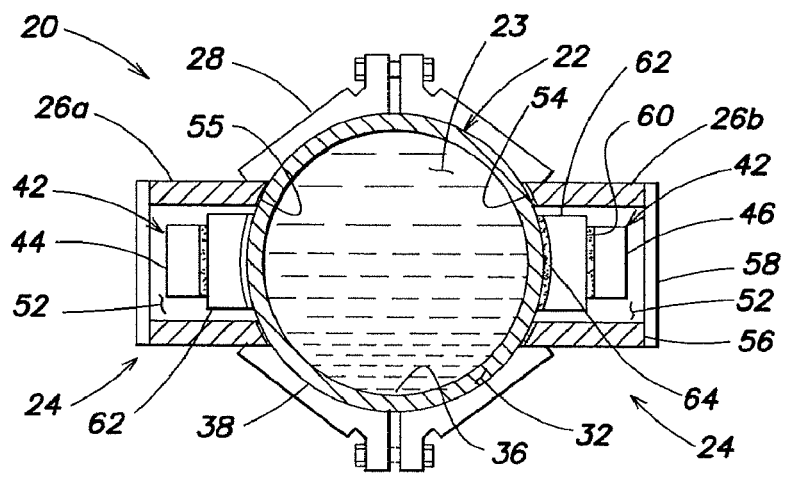
FIG. 3 is a diagrammatic cross-sectional view of the flow meter system illustrating an embodiment of the present invention sensor protective device.
Figure 4:
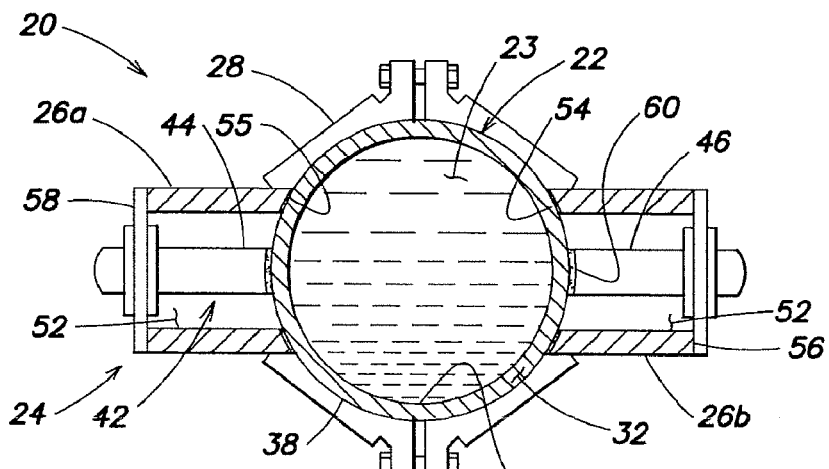
FIG. 4 is a diagrammatic cross-sectional view of the flow meter system illustrating an embodiment of the present invention sensor protective device.

Now referring to FIGS. 2-4, the housing 26 includes at least one pocket 52 extending between a pipe-side surface 54 and an outer surface 56. In the embodiment shown in FIG. 2, the housing 26 includes a first portion 26a and a second portion 26b aligned with each other on opposite sides of the pipe 22. Each portion 26a, 26b includes at least one pocket 52. The pipe-side surface 54 of each portion 26a, 26b is configured to mate with the exterior surface 38 of the pipe 22. The pocket 52 in each housing portion 26a, 26b extends all the way through the respective housing portion.

The housing portions 26a, 26b are attached to the exterior surface 38 of the pipe 22 and a sealant 55 is disposed between the pipe exterior surface 38 and pipe-side surface 54 of the housing 26, which sealant 55 forms a seal around the pocket 52 when the housing 26 is mounted on the exterior surface 38 of the pipe 22. In the embodiment shown in FIG. 2, the housing portions 26a, 26b are attached to the pipe 22 by a bonding agent acting on the exterior surface 38 of the pipe 22 and the pipe-side surface 54 of the respective housing portion. In this embodiment, the bonding agent acts as the sealant 55. An example of an acceptable bonding agent is Loctite® Hysol® 9460™ epoxy adhesive commercially offered by the Henkel Corporation. The present invention is not limited to a bonded interface between the housing 26 and the exterior surface 38 of the pipe 22, however. In alternative embodiments, the housing 26 may be mechanically coupled to the exterior surface 38 of the pipe 22 and a seal material 55 (e.g., formable or solid gasket material, sealant, elastomeric member, etc.) disposed between the pipe-side surface and the exterior surface 38. In all embodiments, the seal created at the interface between the housing 26 and the exterior surface 38 of the pipe 22 is adequate to prevent leakage of acoustic couplant 60 from inside the housing 26 to outside the housing 26.

The housing 26 can be formed from a variety of materials (e.g., metal, polymer, etc.) and is not limited to any particular material. The environment in which the flow meter 24 is deployed may influence the choice of material.

In some embodiments, a cover 58 is attached to the outer surface 56 of each housing portion 26a, 26b. The cover 58 seals the outer surface 56 end of the pocket 52 and prevents undesirable environmental contaminates (e.g., water, dirt, etc.) from entering the pocket 52, and also provides a sufficient barrier to keep acoustic couplant 60 (e.g., in gel or paste form) disposed within the pocket 52 from drying out over a reasonable period of time under applicable environmental conditions. FIG. 2 illustrates a cover 58 in the form of a plate attached to the outer surface 56 of each housing portion 26a, 26b. The present invention is not limited to this embodiment and may, for example, include formable material cover disposed within the pocket 52 that fills in the pocket 52 around the periphery of the sensor 42, thereby providing a seal between the sensor 42 and the pocket 52. In yet another embodiment, the cover 58 can be attached to the sensor(s) 42 that will be inserted within the pocket 52. The cover 58 is attached to the sensors 42 in such a way that it locates and positions the sensors 42 relative to the pocket 52 and also seals the pocket 52 (See FIG. 4)

Now referring to FIG. 3, in some embodiments the housing pockets 52 may be sized to include a shoe 62 disposed within the pocket 52 between the pipe wall 32 and the sensor 42. The shoe 62 is bonded to the exterior surface 38 of the pipe 22 along a pipe-side surface 64 of the shoe 62 that mates with the pipe wall 32. The shoe 62 is operable to act as a signal guide between the sensor 42 and the pipe wall 32. Acoustic couplant 60 is disposed between the shoe 62 and the sensor disposed within the pocket 52.

The present invention can be used with a variety of sensor 42 configurations. Housing 26 embodiments having a first housing portion 26a and a second housing portion 26b disposed on opposite sides of the pipe 22 can be used with a sensor configuration having ultrasonic transmitters and receivers disposed on opposite sides of the pipe; e.g., the transmitters 44 can be disposed within the first housing portion 26a and the receivers 46 can be disposed in the second housing portion 26b (e.g., FIGS. 1-4). Housing embodiments having a single portion disposed on a particular side of the pipe 22 can, for example, be used with alternative ultrasonic sensor configurations; e.g., pitch and catch configurations, pulse echo configurations, combined transmitter/receiver ultrasonic sensors, etc.

In the assembly of the ultrasonic flow meter system 20, the sensor housing(s) 26 are attached to the exterior surface 38 of the pipe 22 in a manner that creates a seal between the exterior surface 38 of the pipe 22 and the pipe-side surface 54 of the housing 26. Acoustic couplant 60 is disposed within the housing pocket 52 between the sensors 42 and pipe 22; e.g., either directly between the pipe exterior surface 38 and the sensor 42, or indirectly between the sensor 42 and a shoe 62 disposed within the pocket 52. The acoustic couplant 60 may be placed within the pocket 52 prior to inserting the sensor(s), or after the sensor(s) is inserted, or some inserted before and some after the sensor(s) 42 is inserted. Once the sensors 42 and the acoustic couplant 60 are positioned within the pocket 52, the pocket 52 can be sealed with a cover 58.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. An apparatus for measuring one or more characteristics of a fluid flowing within a pipe, which pipe has a pipe wall and an exterior surface, the apparatus comprising:
   a housing operable to be mounted on the exterior surface of the pipe, which housing has at least one pocket extending between a pipe-side surface and an outer surface, wherein the pipe-side surface mates with the exterior surface of the pipe;
   an acoustic couplant disposed within the at least one pocket, between each sensor unit and the exterior surface of the pipe;
   a sealant disposed between the exterior surface of the pipe and the pipe-side surface of the housing, which sealant forms a seal around the pocket when the housing is mounted on the exterior surface of the pipe, which seal is operable to prevent acoustic couplant leakage from inside the housing to outside the housing; and
   an array of at least two ultrasonic sensor units for transmitting ultrasonic signals through the fluid flow within the pipe and a receiver for receiving such signals, which array is disposed within the at least one pocket.

2. The apparatus of claim 1, wherein each sensor unit is disposed in a different pocket.

3. The apparatus of claim 2, wherein the housing includes a first portion and a second portion with at least one pocket and the pipe-side surface configured to mate with the exterior surface of the pipe, wherein the first portion and the second portion are aligned with each other on opposite sides of the pipe.

4. The apparatus of claim 1, wherein the couplant is in contact with both the exterior surface of the pipe and each sensor unit.

5. The apparatus of claim 4, wherein each pocket is sealed to enclose the sensor unit within the pocket.

6. The apparatus of claim 1, wherein a shoe is disposed within the pocket, between the sensor and the pipe wall.

7. The apparatus of claim 1, wherein the sealant bonds the pipe-side surface of the housing to the exterior surface of the pipe.

8. A flow meter sensor protective device, comprising:
   a housing operable to be mounted on an exterior surface of a pipe, which housing has at least one pocket extending between a pipe-side surface and an outer surface, wherein the pipe-side surface mates with the exterior surface of the pipe, which pocket is sized to receive an array of at least two ultrasonic sensor units;
   a sealant operable to be disposed between the exterior surface and pipe-side surface, and operable to form a seal around the pocket when the housing is mounted on the exterior surface of the pipe; and
   at least one pocket cover operable to seal the at least one pocket.

9. The device of claim 8, wherein the housing includes a first portion and a second portion with at least one pocket and the pipe-side surface configured to mate with the exterior surface of the pipe, wherein the first portion and the second portion are positionable on opposite sides of the pipe.

10. The device of claim 9, wherein each pocket is sealed to enclose the sensor unit within the pocket.

11. The device of claim 9, wherein each pocket is sized to receive a shoe within the pocket, between the sensor and the pipe wall.

12. The device of claim 9, wherein the sealant is operable to bond the pipe-side surface of the housing to the exterior surface of the pipe.

* * * * *